US006488741B2

(12) United States Patent
Olson

(10) Patent No.: US 6,488,741 B2
(45) Date of Patent: Dec. 3, 2002

(54) LIGHT HYDROCARBON SEPARATION USING 8-MEMBER RING ZEOLITES

(75) Inventor: David H. Olson, Pennington, NJ (US)

(73) Assignee: The Trustess of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/844,314

(22) Filed: Apr. 27, 2001

(65) Prior Publication Data

US 2002/0144597 A1 Oct. 10, 2002

Related U.S. Application Data

(63) Continuation-in-part of application No. 09/768,943, filed on Jan. 23, 2001.

(51) Int. Cl.[7] .............................................. B01D 53/04
(52) U.S. Cl. ................... 95/144; 95/45; 95/96; 208/310 Z
(58) Field of Search ................... 95/141, 143, 144, 95/96, 45; 423/328.2, DIG. 30; 502/60; 585/820; 208/310 Z

(56) References Cited

U.S. PATENT DOCUMENTS

| | | |
|---|---|---|
| 2,850,549 A | 9/1958 | Ray |
| 2,866,835 A | 12/1958 | Kimberlin, Jr. |
| 3,037,338 A | 6/1962 | Thomas |
| 3,218,367 A | 11/1965 | Chen |
| 3,723,302 A | 3/1973 | Pharis |
| 3,969,223 A | 7/1976 | Rosback |
| 4,309,281 A | 1/1982 | Dessau |
| 4,544,538 A | 10/1985 | Zones |
| 4,698,217 A | 10/1987 | Valyocsik |
| 4,717,398 A * | 1/1988 | Pearce .......................... 95/144 |
| 4,744,805 A * | 5/1988 | Maroulis et al. .............. 95/130 |
| 5,276,246 A | 1/1994 | McCulloch |
| 5,470,925 A * | 11/1995 | Ramachandran et al. ... 526/351 |
| 5,744,685 A | 4/1998 | Wilson, Jr. |
| 5,783,167 A | 7/1998 | Canos |
| 5,863,420 A | 1/1999 | Kwasniewski |
| 5,972,204 A | 10/1999 | Canos |
| 6,001,320 A * | 12/1999 | Addiego ....................... 423/212 |
| 6,008,426 A | 12/1999 | Van Oorschot |
| 6,066,238 A | 5/2000 | Perry |
| 6,077,498 A | 6/2000 | Cabañas |
| 6,106,702 A | 8/2000 | Sohn |
| 6,118,035 A | 9/2000 | Fung |
| 6,121,503 A | 9/2000 | Janssen |
| 6,143,057 A * | 11/2000 | Bulow et al. .................. 502/79 |
| 6,200,366 B1 * | 3/2001 | Bulow et al. .................. 95/101 |
| 6,293,999 B1 * | 9/2001 | Cheng et al. .................. 95/103 |
| 6,296,688 B1 * | 10/2001 | Cheng et al. .................. 95/101 |
| 6,319,487 B1 * | 11/2001 | Liu et al. ..................... 423/706 |

FOREIGN PATENT DOCUMENTS

| | | |
|---|---|---|
| EP | 0511885 B1 | 11/1992 |
| EP | 0572239 A1 * | 12/1993 |
| EP | 0655492 A2 | 5/1995 |
| EP | 0943585 A2 | 9/1999 |
| WO | WO 98/54091 | 12/1998 |

OTHER PUBLICATIONS

W.M. Meier and D.H. Olson, Atlas of Zeolite Structure Types, 3rd Revised Edition, pp. 122, 200, Butterworth–Heinemann, 1992.*

Database of Zeolite Structures, http://www.iza–structure.org/databases/, 2000.*

Järvelin and Fair, "Adsorptive Separation of Propylene—Propane Mixtures," Ind. Eng. Chem. Res., vol. 32, (1993), pp. 2201–2207.

Eldridge, "Olefin/Paraffin Separation Technology: A Review," Ind. Eng. Chem. Res., vol. 32, (1993), pp. 2208–2212.

Rege and Yang, "Kinetic Separation of Oxygen and Argon Using Molecular Sieve Carbon," Adsorption vol. 6, (2000), pp. 15–22.

Silva, da Silva and Rodrigues, "Methodology of gas adsorption process design. Separation of propane/propylene and n/iso–paraffins mixtures," Adsorption and its Applications in Industry and Environmental Protection Studies in Surface Science and Catalysis, vol. 120, (1998), pp. 371–394.

den Exter, Jansen and van Bekkum, "Separation of Permanent Gases on the All–Silica 8–Ring Clathrasil DD3R," Zeolites and Related Microporous Materials: State of the Art 1994, Studies in Surface Science and Catalysis, vol. 84, pp. 1159–1166, (1994).

Zhu, Kapteijn, Moulijn, den Exter and Jansen, "Shape Selectivity in Adsorption on the All–Silica DD3R," Langmuir, vol. 16, (2000), pp. 3322–3329.

Zhu, Kapteijn and Moulijn, "Shape selectivity in the adsorption of propane/propene on the all–silica DD3R," Chem. Commun., (1999), pp. 2453–2454.

Camblor, Corma, Lightfoot, Villaescusa and Wright, "Synthesis and Structure of ITQ–3, the First Pure Silica Polymorph with a Two–Dimensional System of Straight Eight–Ring Channels," Angew. Chem. Int. Ed. Engl., vol. 36, No. 23, (1997), pp. 2659–2661.

(List continued on next page.)

Primary Examiner—David A. Simmons
Assistant Examiner—Frank M. Lawrence
(74) Attorney, Agent, or Firm—John S. Child, Jr.; Patrick J. Hagan

(57) ABSTRACT

A method of selectively adsorbing propylene in mixtures of propylene/propane and propylene/olefins through the use of zeolites having structures with a maximum of 8-member rings of tetraheda controlling the diffusion rate. Suitable zeolite adsorbents are those having the CHA and ITE structure types. Other 8-member ring zeolites, including aluminosilicates, with a Si:Al molar ratio of at least about 200 and having substantially no free acid are also suitable adsorbents.

29 Claims, 15 Drawing Sheets

OTHER PUBLICATIONS

Kärger and Ruthven, "Diffusion Controlled Separation Processes," *Diffusion in Zeolites and Other Microporous Solids,* Chapter 17, pp. 563–585, (No date given).

Stewart, Johnson and Shannon, "Synthesis and Characterisation of Crystalline Aluminosilicate Sigma–1," *Innovation in Zeolite Materials Science* (1988), pp.57–64.

Díaz–Cabañas, Barrett and Camblor, "Synthesis and structure of pure $SiO^2$ chabazite: the $SiO_2$ polymorph with the lowest framework density," *Chem Commun.* 1998, 1981.

Gies, "Crystal structure of deca–dodecasil 3R, the missing link between zeolites and clathrasils," *Z Kristallogr. 1986,* 175, 93. (1986).

Kühl, "Source materials for zeolite synthesis," *Verified Syntheses of Zeolitic Materials,* Second Revised Edition, H. Robson, ed.(2001).

Crank, "Diffusion from a stirred solution of limited volume," § 4.35, *The Mathematics of Diffusion,* Oxford At The Clarendon Press, 1956.

Laurance and Swift, "Relative Volatility of Propane–Propene System from 100–160° F," *J. Chem. Eng. Data,* 1972, 17, 3, pp. 333–337. (1972).

Meier, Olson and Baerlocher, "Chabazite," *Atlas of Zeolite Structure Types,* Fourth Revised Edition, (1996), pp. 76–77.

* cited by examiner

LIGHT HYDROCARBON SEPARATION USING 8-MEMBER RING ZEOLITES

CROSS-REFERENCE TO RELATED APPLICATIONS

This Application is a continuation-in-part of my co-pending Application Ser. No. 09/768,943, filed on Jan. 23, 2001, the disclosure of which is incorporated herein by specific reference.

FIELD OF THE INVENTION

The invention relates generally to a process for the adsorptive separation of low molecular weight hydrocarbons. In a preferred embodiment, the invention relates to the kinetic separation of propylene from other hydrocarbons, in particular, from propane. The process employs at least one substantially acid-free zeolite having an 8-member ring channel system. Preferred zeolite structure types are CHA and ITE.

RELATED ART

It has long been known that certain porous substances such as zeolites which have certain selective adsorption characteristics are useful in separating a hydrocarbon mixture into its component parts. Similarly, it is well known in the separation art that certain crystalline zeolites can be used to separate certain hydrocarbons from feed mixtures.

The separation of propylene-propane mixtures is one of the most important operations in the petrochemical industry. Such mixtures usually result from the thermal or catalytic cracking of hydrocarbons, and the majority of them represent coproducts with ethylene. Their separation is of great economic consequence, since the separated propylene has many uses, one of the most important being as monomer feedstock for polypropylene elastomer production. For most end uses the propylene must have a high purity. The propane fraction can be recycled to the cracking step or used separately, e.g., as liquefied petroleum gas (LPG) for heating.

The conventional method for separating the propylene-propane mixture is fractional distillation. The relative volatility for the mixture is in the range of 1.09–1.15 (Laurance and Swift, 1972), depending on composition and pressure of operation. A large number of contacting stages are required (over 100), and the associated high reflux ratio requires a large input of energy. The U.S. Department of Energy has reported that the propylene/propane separation is the most energy-intensive single distillation practiced commercially (Wiley, 1992).

A significant amount of the light olefins produced during the refining of crude oil is used as refinery fuel. Cost-effective separation technologies will be required that can withstand the harsh operating environment of a petroleum refinery. In addition to traditional refinery and olefin plant applications, paraffin dehydrogenation units for the production of olefins from natural gas liquids (NGL) have recently been brought on stream. For these small units, typically less than 5,000 bbl/day of olefin production, novel separation technologies may be more competitive with more traditional unit operations.

Recent federal regulations, such as the Clean Air Act, mandate that hydrocarbon emissions from refineries and chemical plants be reduced to low levels. To reduce the economic penalty of environmental compliance, low-cost hydrocarbon separation technologies are required. For facilities located in nonattainment areas, the need to reduce hydrocarbon losses is especially critical. Facilities can no longer afford to dispose of waste hydrocarbon streams in their flare systems. Purge streams from polyolefin reactors and vents from polymer storage facilities, which were once flared, must be redirected to recovery systems. For streams containing a mixture of paraffinic and olefinic material, economic and process considerations may dictate that the olefin be recovered and recycled.

Propylene is obtained by recovery from petroleum feed stocks which include mixtures of olefins and paraffins. Although propylene can be separated without difficulty from certain olefins and paraffins by fractional distillation, that separation technique is less useful for olefins and paraffins having similar boiling points and similar volatilities, in particular propylene and propane. For this reason, the separation of propylene in highly purified form from a mixture containing propylene and propane is difficult and, as noted above, consumes a large amount of energy.

SUMMARY OF THE INVENTION

It is an object of this invention to provide a zeolite adsorbent material that will separate propylene from propylene/propane and propylene/olefin mixtures in a cost efficient manner. To that end, the zeolites used in practicing this invention are relatively inexpensive. The zeolites also have a high adsorption capacity for propylene and a high degree of selectivity for propylene over propane and other olefins. These zeolites are, therefore, suitable for large scale commercial operations.

It is another object of this invention to provide a more environmentally acceptable process for obtaining highly purified propylene from a propylene/propane mixture.

It is yet another object of the invention to carry out a separation of other light hydrocarbons using the kinetic based process of this invention in an energy-efficient manner. It is a further objective of the invention to provide a separation process that is highly efficient in having high diffusion rates for propylene relative to propane.

The invention can be summarized as encompassing certain zeolite adsorbents, methods for preparation of such zeolites, and their use in methods of separating a mixture containing at least two hydrocarbons.

The zeolites of the invention comprise or consist of zeolites having a channel structure that has 8-member rings of tetrahedra defining diffusion in the channels. The zeolites are also substantially acid-free. Zeolites containing as constituents both aluminum and silicon must have an Si:Al molar ratio of at least about 200. Low silicon zeolites such as aluminophosphate-type zeolites are also suitable, provided they satisfy the other requirements stated herein. Examples of suitable aluminophosphate-type zeolites and zeolites containing as constituents aluminum and silicon are set forth below.

The zeolites of the invention are also characterized as having a propylene/propane diffusion ratio of greater than about 50 (at 80° C. and 600 torr hydrocarbon pressure) and having a propylene absorption capacity greater than 40 mg/g at 80° C. and 600 torr propylene pressure. Suitable zeolites are those having an 8-member ring channel structure and a molar ratio of silica to aluminum of at least about 200:1 and may have at least one low activity metal cation to minimize the acid activity of the zeolite so that it does not result in significant polymerization of the olefins. Preferred zeolites are those having CHA and ITE-type structures.

The invention also provides a process for separating hydrocarbons from a hydrocarbon mixture and, in particular, propylene from a propane/propylene mixture using the above-described zeolite adsorbent. The process comprises the steps of contacting the hydrocarbon mixture with at least one of the zeolites to effect separation of propylene. In a preferred embodiment, the zeolite adsorbent separates propylene from propylene/propane and propylene/propane/ethylene mixtures.

DETAILED DESCRIPTION OF THE INVENTION

Figure 1:
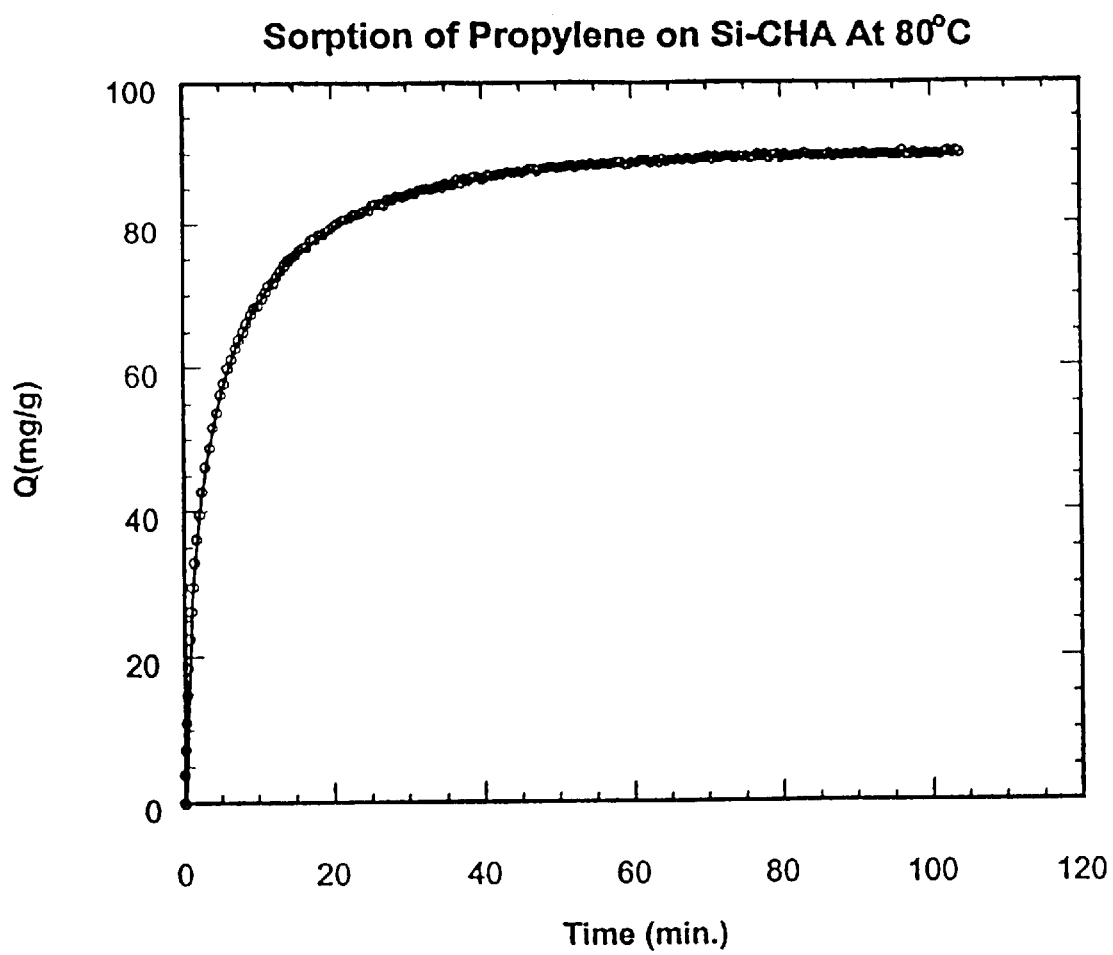
FIG. 1 shows the amounts of propylene adsorbed in milligrams per gram of zeolite Si—CHA over time and under conditions of 600 torr propylene and 80° C.

Zeolites are commonly classified as large-pore, medium-pore and small-pore and in most cases the channel system of such zeolites are accessed via 12-member rings (or larger), 10-member rings, or 8-member rings (or smaller), respectively.

The zeolites of this invention have 8-member rings of tetrahedra as the largest ring size, thereby limiting access to the pore system by larger hydrocarbons. A large number of zeolites have 8-member rings of tetrahedra as the largest ring size. These zeolites are referred to as 8-member ring or small pore zeolites.

The Structure Commission of the International Zeolite Association has assigned three letter structure type codes to all zeolites of known structure. Frequently, different names have been assigned to materials having the same structure type, such materials being referred to as isotypes. This may occur in cases where the materials have a composition different from the material which was the basis for the original assignment of the structure type code. As an example, the structure type code CHA is derived from the zeolite mineral chabazite. The CHA structure type has the following isotypes: $AlPO_4$—(CHA), CaAPO-44, CaAPO-47, $GaPO_4$-34, LZ-218, Linde D, Linde R, MeAPO-47, MeAPSO-47, Phi, SAPO-34, SAPO-47, Si—CHA, SSZ-13, Wilhendersonite, ZK-14 and ZYT-6, in addition to the material chabazite. A description of these structures, their type codes, and a listing of their isotypes are given in *Atlas of Zeolite Structure Types* by W. M. Meier, D. H. Olson and Ch. Baerlocher, Elsevier, 1996, which is incorporated by reference herein.

A partial listing of such 8-member ring structures, taken from *Atlas of Zeolite Structure Types*, is given below:

| 8-Member Ring Structures | |
|---|---|
| ABW | Li—A (Barrer and White) |
| AEI | $AlPO_4$—18 |
| AFX | SAPO—56 |
| APC | $AlPO_4$—C |
| ATN | MAPO—39 |
| ATT | $AlPO_4$—12—TAMU |
| ATV | $AlPO_4$—25 |
| AWW | $AlPO_4$—22 |
| CHA | Chabazite, SSZ—13 |
| DDR | Deca-dodecasil 3R |
| EAB | TMA—E |
| ERI | Erionite |
| JBW | NaJ (Barrer and White) |
| KFI | ZK—5 |
| LEV | Levyne |
| LTA | Linde Type A |
| MER | Merlinoite |
| PAU | Paulingite |
| PHI | Phillilpsite |
| RHO | Rho |
| RTE | RUB—3 |
| RTH | RUB—13 |
| ZON | ZAPO—M1 |
| ITE | ITE—3 |

Zeolites of the ITE structure type include ITQ-3. Zeolites of the DDR structure type include DD3R, ZSM-58 and Sigma 1. The zeolite structure types that are the most preferred adsorbents are zeolites of the CHA (Chabazite), ITE and DDR (Deca-Dodecasil-R) structure types and preferably CHA and ITE types. Descriptions of zeolites of CHA and DDR structure types including identifications of structure and chemical compositions are set forth in W. M. Meier, et al., referenced hereabove. A description of ITQ-3 structure type zeolite is set forth in Published International Application WO/98/54091 to M. Camblor et al., which is incorporated herein by reference. A description of the CHA type zeolite, SSZ-13, is set forth in U.S. Pat. No. 4,544,538 to Zones, which is incorporated herein by reference.

Other preferred adsorbents are zeolites having 8-member rings that have a high Si:Al mole ratio and are substantially acid free. High Si:Al ratio is defined as a ratio of at least about 200, more preferably at least 300 and most preferably at least 500. For efficient, long-term operation of the adsorption process, it is critical that the adsorbent have either essentially no acidity or acid activity that does not polymerize olefins. Acidic sites in the adsorbent will result in polymerization of the desired olefins that would require thermal activation to remove. Accordingly, the term "substantially acid-free" is used herein to encompass zeolites that do not polymerize olefins in a manner that would prevent long-term operation of the adsorption process. In addition to the cost of the thermal treatment there is a substantial time requirement, as well, both of which would significantly reduce operating efficiency. Equilibrium should be reached in 60 minutes, more preferably in 30 minutes, and even more preferably in less than 15 minutes.

Control of acidity can be done in several ways. One method of reducing acidity is to subject the zeolite to ion exchange with low activity metal cations. Preferred cations for this purpose are alkali metal cations, such as sodium, potassium or cesium. The larger cations have the advantage of weaker interactions with olefins and hence lower temperature and/or faster desorption of the desired olefin. The preferred method of avoiding acidity and ensuring the desired Si:Al ratio is to synthesize the zeolite adsorbent with the lowest possible aluminum content. Practical considerations may preclude reaching the low levels achievable at the laboratory scale. Tetramethyl- and tetraethyl-orthosilicate will produce the lowest alumina content zeolites; materials having $SiO_2/Al_2O_3$ ratios above about 50,000 should be achievable. Using fumed silica as the silica source should result in zeolite products having $SiO_2/Al_2O_3$ ratios above about 20,000. Colloidal silica sol, available in bulk commercial scale quantities, will yield zeolites having $SiO_2/Al_2O_3$ ratios of about 3,000. Sodium waterglass, also available in bulk quantities, is a widely used silica source and can produce zeolites having $SiO_2/Al_2O_3$ ratios of about 600 (see G. H. Kuehl, in *Verified Synthesis of zeolitic Materials*, H. Robson, editor, *Microporous and Mesoporous Materials*, Vol. 22 (1998)).

As noted above, the zeolites or molecular sieves can also be of the aluminophosphate-type. Aluminophosphate-type zeolites having a channel structure that has 8-member rings of tetrahedra defining diffusion in the channels includes those having AEI, AET, AFT, AFX, ACL, APD, ATN, ATT, ATV, AWW, and ZON structure types. These zeolites must also be substantially acid free, have a propylene/propane diffusion ratio of greater than about 50 (at 80° C. and 600 torr hydrocarbon pressure) and a propylene adsorption capacity greater than 40 mg/g at 80° C. and 600 torr pressure propylene.

The discovery that substantially acid-free zeolites having 8-member rings and Si:Al mole ratios of at least about 200 or 8-member ring aluminophosphate-based zeolites make good adsorbents for separation of propylene from hydrocarbon mixture is of considerable practical importance. While pure zeolites of the CHA and ITE structure types are operable, specific zeolites of this type may currently be very expensive to prepare in small quantities, let alone the large amounts of zeolite that would be required for industrial application. The ability to select well-known and relatively inexpensive 8-member zeolites which can then be made suitable for use by routine treatment steps is an essential prerequisite for the commercial application of an industrial process for separation of propylene by zeolite adsorbents.

The zeolites of the present invention are characterized by their unexpectedly high diffusional distinction between propylene and propane. This distinction can be quantified in terms of the ratio of the diffusion coefficients for these two hydrocarbons, e.g., the ratio of $D_{propylene}/D_{propane}$. The effectiveness of an adsorbent for separation increases with the magnitude of this ratio, which is referred to herein as $R_D$. It is well accepted in the art that an adsorbent having an $R_D$ greater than about 50 would be an effective separation adsorbent for a two-component system.

Where the $R_D$ value for propane/propylene approaches unity, there is no kinetic based preferential adsorption of one component over the other. As the value of $R_D$ becomes less or greater than unity, there is a preferential selectivity by the adsorbent for one of the two components. When comparing a $R_D$ value of propylene relative to propane, a selectivity larger than unity indicates preferential adsorption of propylene within the adsorbent, while a $R_D$ value less than unity would indicate that propane is preferentially adsorbed by the adsorbent.

The zeolites of the present invention have a $R_D$ ratio (propylene/propane diffusion ratio) of greater than fifty (50), preferably greater than one hundred (100), more preferably greater than two hundred (200) and most preferably greater than five hundred (500).

Another important adsorbent property of a zeolite is its adsorption capacity, for example as measured by the weight of hydrocarbon adsorbed per unit weight of adsorbent. A zeolite's capacity to adsorb propylene is defined as the number of milligrams of propylene adsorbed per gram of zeolite at equilibrium. Equilibrium condition is defined as no change in amount of propylene adsorbed by the zeolite. In principle, the higher the adsorption capacity the less the adsorbent that will be required to separate a given quantity of hydrocarbon, e.g., propylene, for an adsorbent having a given $R_D$. The zeolites of this invention are also characterized by their high adsorption capacity. Specifically, the zeolite of the present invention has a propylene adsorption capacity of greater than 40 milligrams (mg) propylene per gram (gm) zeolite measured at 80° and a propylene pressure of 600 torr. The zeolite's propylene adsorption capacity at that temperature and pressure is preferably at least 60 mg/g and more preferably 100 mg/g.

A high $R_D$ value is required to achieve effective kinetic separation, and a moderate to high adsorption capacity is required to make the separation process practical.

In the description that follows, unless otherwise stated, adsorption capacities will be the values determined when the feed is at 600 torr pressure and the adsorption chamber is at 80° C. Several different modes of making these measurements are feasible.

Another method of controlling a zeolite's behavior as an adsorbent for use in practicing this invention is by controlling the size of the zeolite crystal. Adjusting this size, typically achieved during the zeolite synthesis step, will allow the attainment of practical cycle times, as in a pressure swing adsorption process (PSA process). The adsorption rate varies as the inverse square of the radius of the crystal. Thus a change in the average crystal size by a factor of 10 will produce a factor of 100 difference in the adsorption and desorption step times. Accordingly, careful attention must be given to the control of the size of the zeolite crystals employed. It is preferable that the size of the zeolite crystal is no larger than 1.0 microns and more preferably no larger than 0.1. microns.

The novel separation process of the instant invention involves contacting a mixture containing propylene and one or more hydrocarbons, in particular, propane, that exists either as a gas, liquid or mixed phase with at least one of the class of zeolites described above for a period of time to selectively adsorb propylene within the internal pore structure of the zeolite. The components of the hydrocarbon mixtures that are not adsorbed are thus carried off. The propylene is thereafter recovered from the internal pore structure of the zeolite by conventional desorbing techniques such as stripping with another gas, pressure change, temperature change or a combination of these methods. A single or multistage pressure swing adsorption process (PSA process) is typical of the type of configuration in which this invention may be practiced. Similarly, a single or multistage membrane-based process may be employed. The processes of this invention can also be conducted in flow type (continuous) systems, e.g., a continuous chromatographic type operation. In such a flow type system, a hydrocarbon mixture is passed through a bed containing at least one of the class of zeolites described above. Because of the high selectivity of the zeolites used in practicing this invention, the desired propylene is adsorbed or retained in the bed, while the remaining hydrocarbons are removed. By this process, a highly purified propylene product can be obtained.

The exact temperature at which the novel processes of this invention are conducted will depend upon the type of separation method employed. The temperature, however, must be maintained below that required for a chemical reaction to occur, e.g. below the cracking temperature. The temperature should thus be maintained below about 250° C. Preferably, the processes of this invention can be conducted in the temperature range between −100° C. and about 250° C. and preferably between −20° C. and +100° C.

In the above, materials are described that are useful for the separation of propylene from propane. In this embodiment, propylene is the gas phase component preferentially adsorbed. In the subsequent desorption step, separation and recovery of high purity propylene is achieved. It should be understood that for a different pair of light hydrocarbons, the gas phase component not preferentially adsorbed may be the desired hydrocarbon. In this instance, the non-adsorbed or slowly adsorbed hydrocarbon is separated in high purity and subsequently the adsorbed component is desorbed before this process is repeated.

Thus, the detailed discussion concerning propylene/propane separation illustrates the potential of 8-member ring zeolites for kinetic based separation. These teachings may in turn be applied to other light hydrocarbon pairs, or mixtures, and cases where either the fast adsorbing or the slow adsorbing component is the desired higher value product.

The following examples are presented for illustration purposes only and are not to be taken as limiting the present invention in any way.

EXAMPLES

Preparation of Zeolite Adsorbents Tested

The Si—CHA (a pure silica version of the zeolite chabazite) and ITQ-3 structure type zeolite used in the following examples were obtained from M. Chamblor, who is identified as a joint inventor in Published International Application No. WO 98/54091. A synthesis of Si—CHA is reported in M. J. Diaz-Cabras, P. A. Barrett and M. A. Camblor, Chem. Commun., 1998, 1881. A process for preparing ITQ-3 is disclosed in Published International Application No. WO 98/54091. A synthesis of DD3-R is reported in U.S. Pat. No. 4,698,217. A synthesis of SSZ-13 is reported in U.S. Pat. No. 4,544,538.

Measurement of Adsorption Capacities and Rates

Adsorption measurements were made using a computer controlled thermogravimetric balance consisting of a TA51 thermobalance and associated TA-2000/PC control system. This one atmosphere gas flow through electrobalance system was controlled via Macintosh based LabView control software, Kinetic Systems interface, mass flow controllers and Eurotherm temperature controller. Typically, adsorption capacities and rates were measured at 600 torr hydrocarbon pressure and 30° and/or 80° C.

The relative diffusion parameters were obtained as follows. The diffusion parameter $D/r^2$, where D is the diffusion coefficient and r is the crystal radius, were derived from the sorption measurements with the assumption that the plane sheet model describes the diffusion process. Thus, for a given sorbate loading, Q, the value $Q/Q_\infty$, where $Q_\infty$ is the equilibrium sorbate loading, is mathematically related to $(Dt/r^2)^{1/2}$ where t is the time (sec.) required to reach the sorbate loading Q. Graphical solutions for the plane sheet model are given by J. Crank in *The Mathematics of Diffusion*, Oxford University Press, Ely House, London, 1967. The ratio of the diffusions coefficients, D, for propylene and propane is taken as the ratio of the respective $D/r^2$ values and given the name $R_D$.

Example 1

Si—CHA zeolite having an 8-member ring CHA type structure, having substantially equidimensional crystals ranging in size from 1 to 12 microns and having a dry composition of 100% $SiO_2$ was employed. The Si—CHA zeolite was contacted with propylene at a pressure of 600 torr at 80° C. until equilibrium was obtained. At equilibrium, this zeolite adsorbed 90 milligrams propylene per gram of zeolite. The rate of adsorption, defined as $D/r^2$ (wherein D is diffusion and r is radius of zeolite crystal), was measured over time and calculated as $1.5 \times 10^{-3}$ sec$^{-1}$. The amount of propylene adsorbed in milligrams per gram of zeolite over time is shown in FIG. 1.

Example 2

Figure 2:
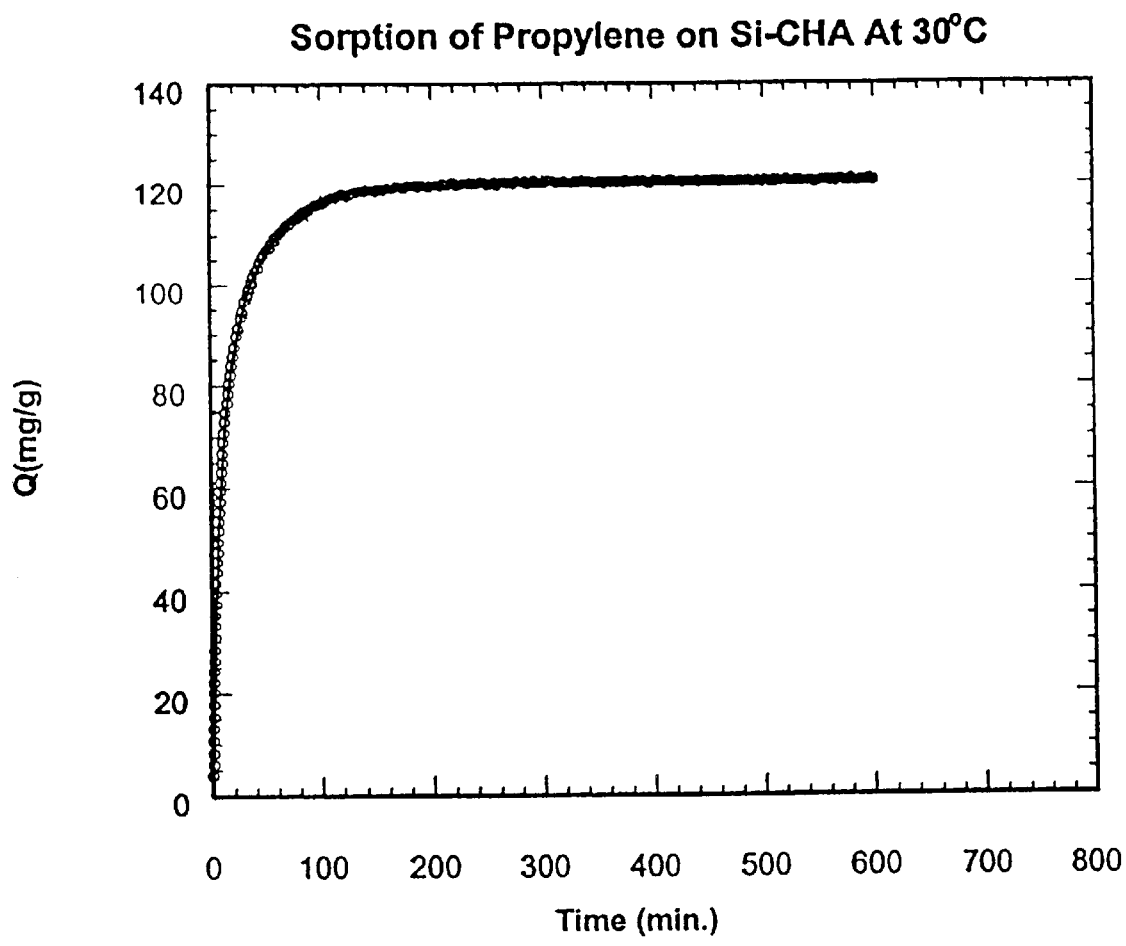
FIG. 2 shows the amounts of propylene adsorbed in milligrams per gram of zeolite Si—CHA over time and under conditions of 600 torr propylene and 30° C.

The Si—CHA zeolite employed in EXAMPLE 1 was contacted with propylene at 600 torr pressure at 30° C. until an equilibrium was obtained. At equilibrium, the zeolite adsorbed 120 milligrams propylene per gram of zeolite. The rate of adsorption, $D/r^2$, was $4.6 \times 10^{-4}$ sec$^{-1}$. The adsorption rate for propylene in milligrams per gram of zeolite, is shown in FIG. 2.

Example 2A

Figure 3:
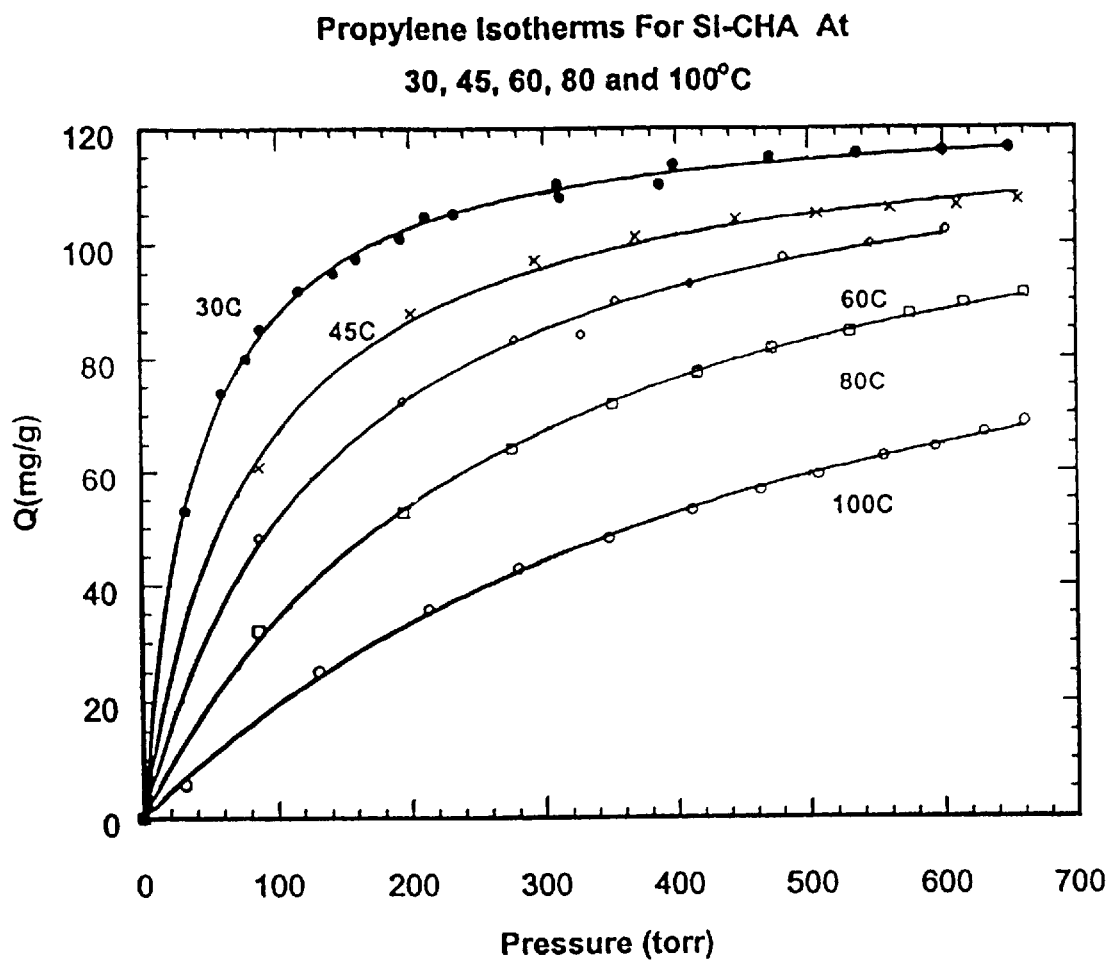
FIG. 3 shows adsorption isotherms for propylene adsorbed, in milligrams per gram of zeolite, on Si—CHA at 30°, 45°, 60°, 80° and 100° C.

Isotherms for the adsorption of propylene by the Si—CHA zeolite at 30° C., 45° C., 60° C., 80° C. and 100° C., were measured. The results are shown in FIG. 3.

Example 3

Figure 4:
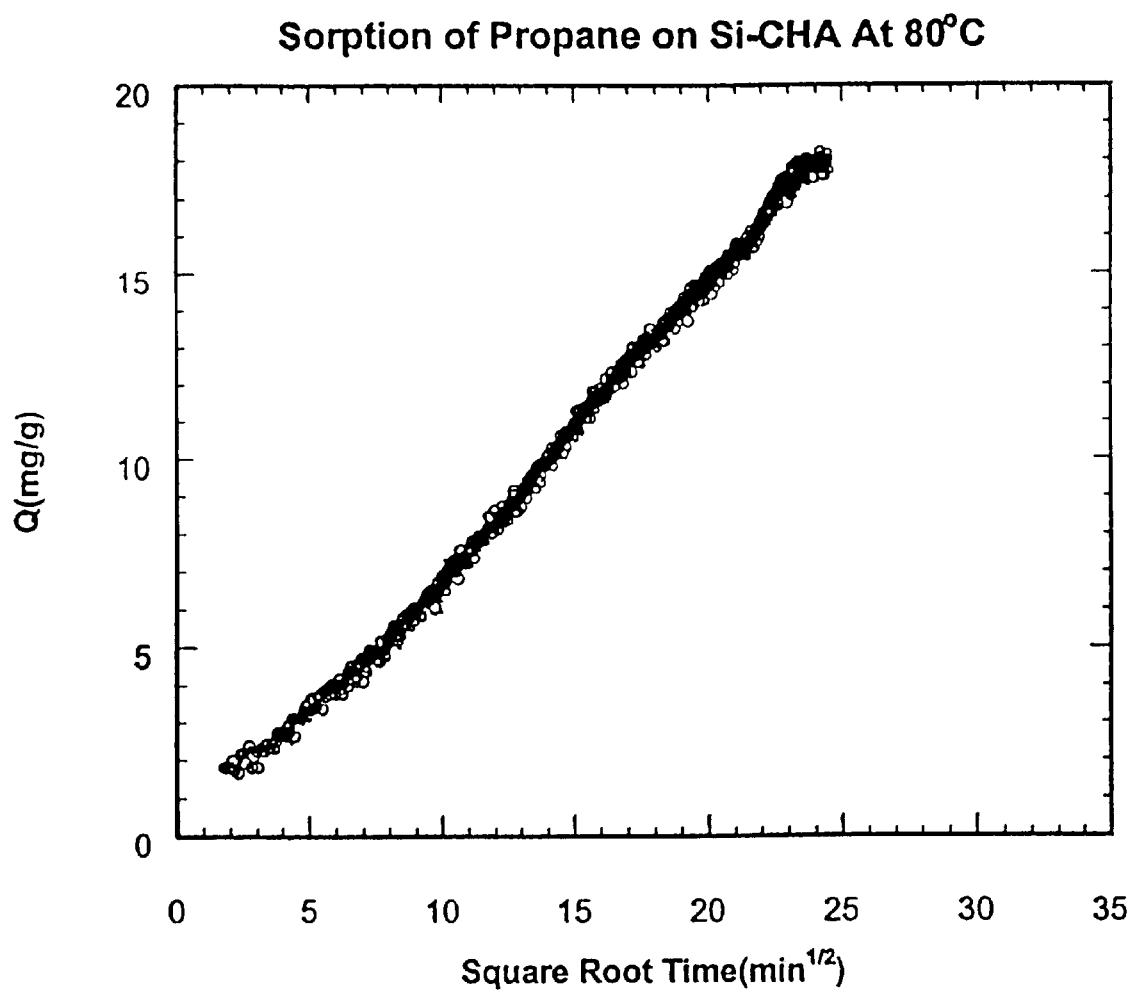
FIG. 4 shows the amount of propane adsorbed, in milligrams per gram of zeolite, on Si—CHA zeolites over time and under conditions of 80° C. and 600 torr propane.

The Si—CHA zeolite employed in Example 1 was contacted with propane at 600 torr pressure and at 80° C. for about 600 minutes as shown in FIG. 4. The rate of adsorption, $D/r^2$ was $9.4 \times 10^{-7}$ sec. Accordingly, the relative adsorption rates of propylene to propane for this zeolite at 80° C., also referred to as $R_D$ is 1,550.

Example 4

The Si—CHA zeolite employed in EXAMPLE 1 was contacted with propane at 600 torr pressure at 30° C. The rate of adsorption was $1.0 \times 10^{-8}$ sec$^{-1}$. The relative propylene/propane diffusion rates for this zeolite at 30° C. is 43,600.

Figure 5:
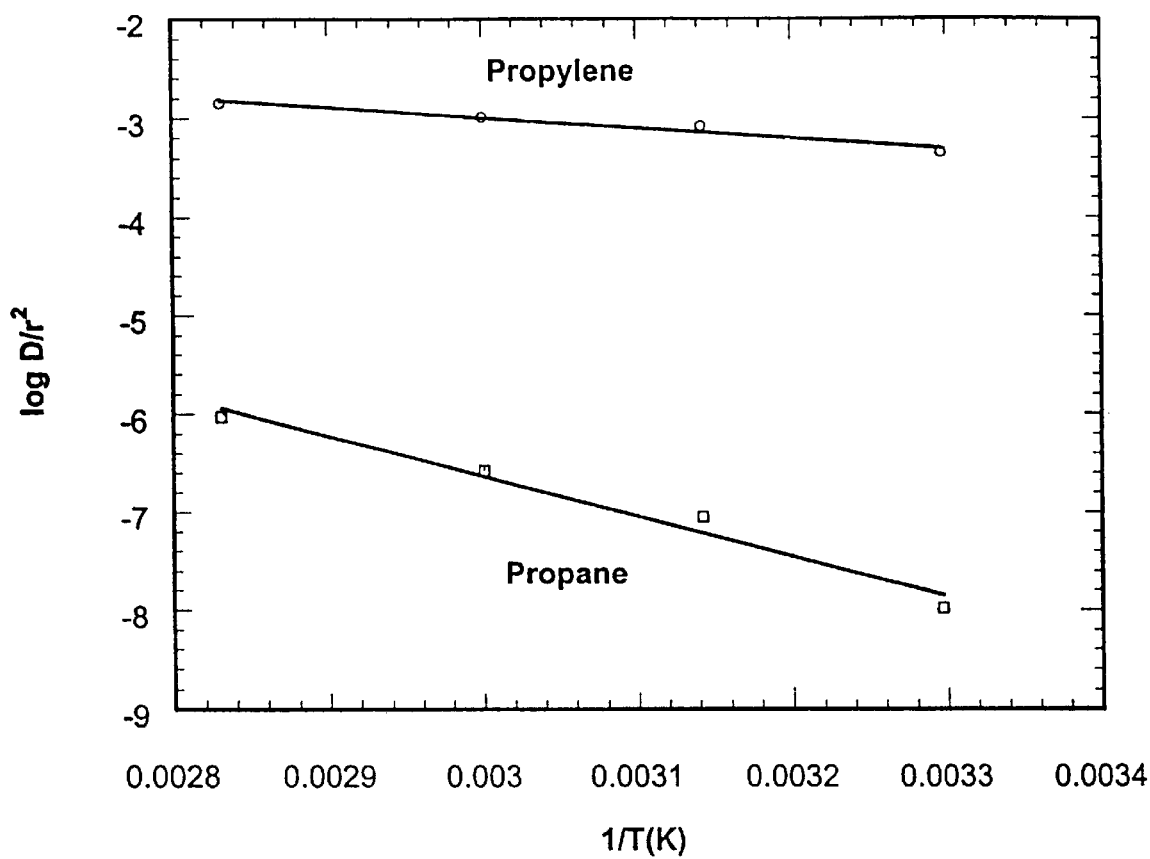
FIG. 5 shows the temperature dependence of diffusion rates for propylene and propane in a zeolite Si—CHA.

The results set forth in the previous examples were analyzed to determine the temperature dependence of diffusion rates for propane and propylene with zeolite Si—CHA. That result is set forth in FIG. 5. The relative diffusion rates of propylene to propane in Si—CHA structure type zeolite range from 1,550 to 43,600 over the temperature range of 80° to 30° C. These diffusion rates for propylene and propane in Si—CHA structure type zeolite at the temperatures tested are set forth below in TABLE 1.

TABLE 1

Diffusion Rates of C$_3$ Hydrocarbons in Si—CHA

| Hydrocarbon | Temperature (° C.) | Diffusion Parameter D/r$_2$ | R$_D$ |
| --- | --- | --- | --- |
| Propylene | 30 | $4.6 \times 10^{-4}$ | |
| Propane | 30 | $1.0 \times 10^{-8}$ | 43600 |
| Propylene | 45 | $8.4 \times 10^{-4}$ | |
| Propane | 45 | $8.9 \times 10^{-8}$ | 9500 |
| Propylene | 60 | $1.1 \times 10^{-3}$ | |
| Propane | 60 | $2.7 \times 10^{-7}$ | 3900 |
| Propylene | 80 | $1.5 \times 10^{-3}$ | |
| Propane | 80 | $9.4 \times 10^{-7}$ | 1500 |

Example 5

Figure 6:
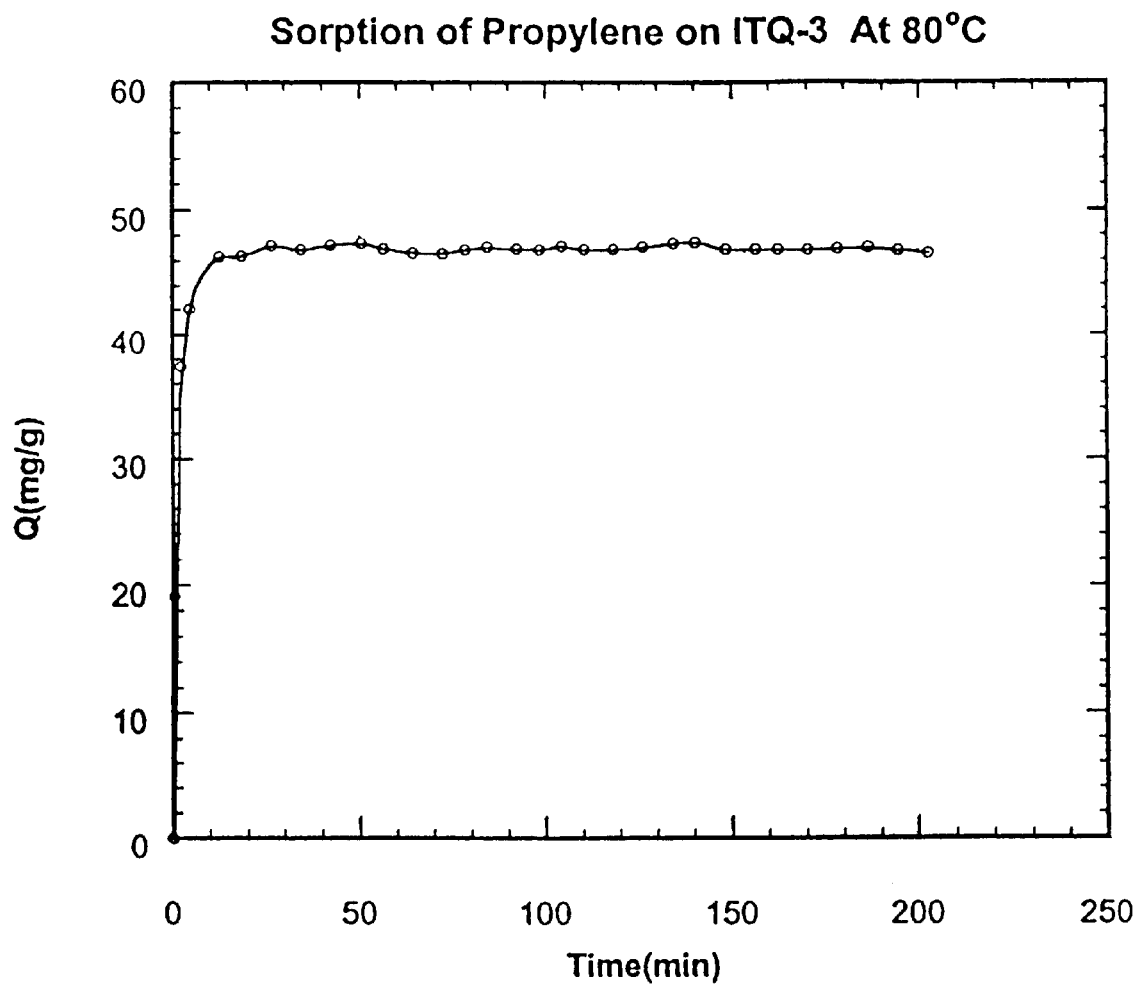
FIG. 6 shows the amount of propylene adsorbed in milligrams per gram of zeolite ITQ-3 over time and under conditions of 600 torr propylene and 80° C.

An ITQ-3 zeolite material having an 8-member ring channel system of the ITE structure type with elongated crystals of about 0.2 to 15 microns in length and the shortest dimension for diffusion from about 0.1 to about 1.0 micron and having a dry composition of 100% SiO$_2$ was employed. This ITQ-3 zeolite was contacted with propylene at a pressure of 600 torr at 80° C. until equilibrium was obtained. At equilibrium, this zeolite adsorbed 46 milligrams propylene per gram zeolite. The rate of adsorption, D/r$^2$, was $3.8 \times 10^{-3}$ sec.$^{-1}$. The amount of propylene adsorbed in milligrams per gram zeolite over time is shown in FIG. 6.

Example 6

Figure 7:
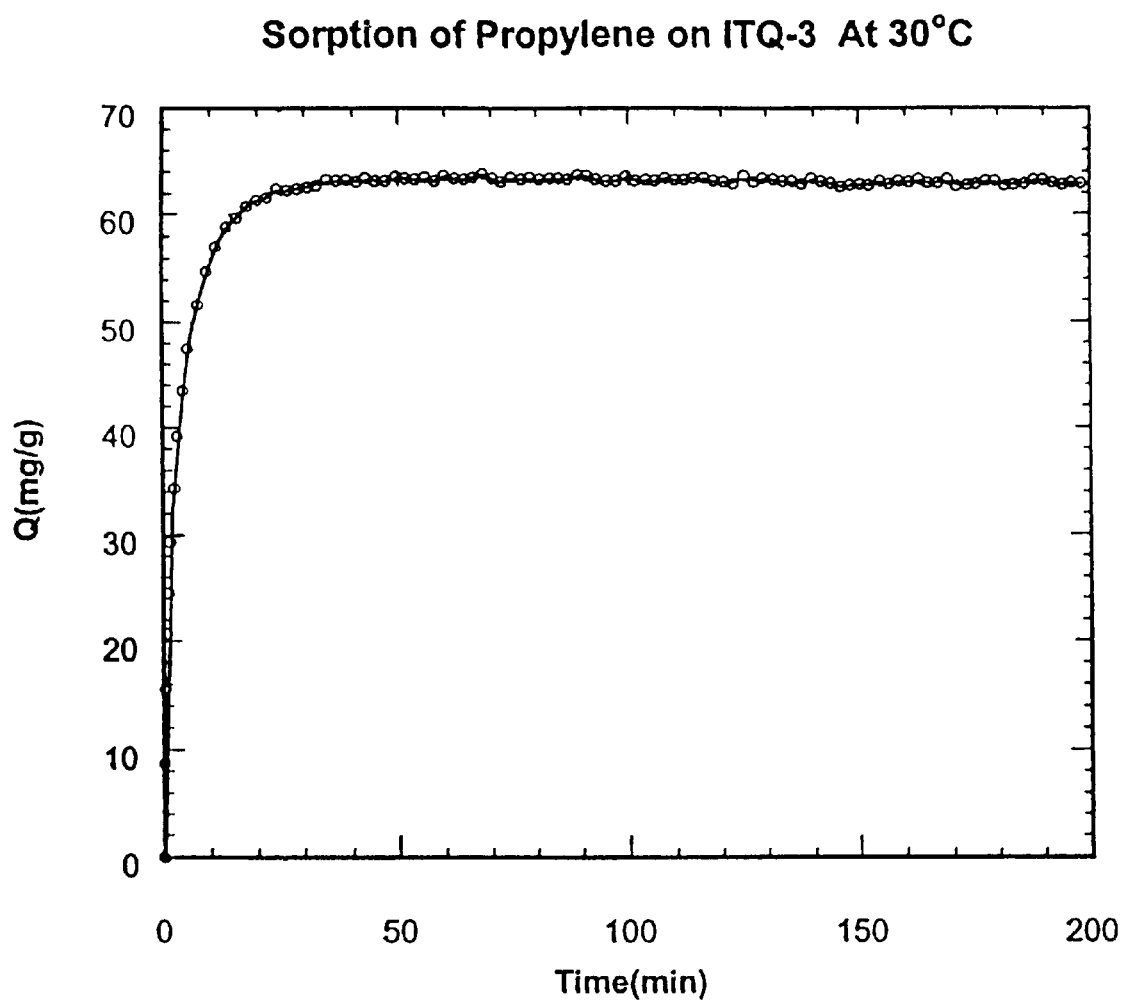
FIG. 7 shows the amount of propylene adsorbed in milligrams per gram of zeolite ITQ-3 over time and under conditions of 600 torr propylene and 30° C.

The ITQ-3 zeolite employed in Example 5 was contacted with propylene at 600 torr pressure at 30° C. until equilibrium was reached. At equilibrium, this zeolite adsorbed 63 milligrams propylene per gram of zeolite. The rate of adsorption, D/r,$^2$ was $1.5 \times 10^{-3}$ sec$^{-1}$. The amount of propylene adsorbed in milligrams propylene per gram of zeolite over time is shown in FIG. 7.

Example 6A

Figure 8:
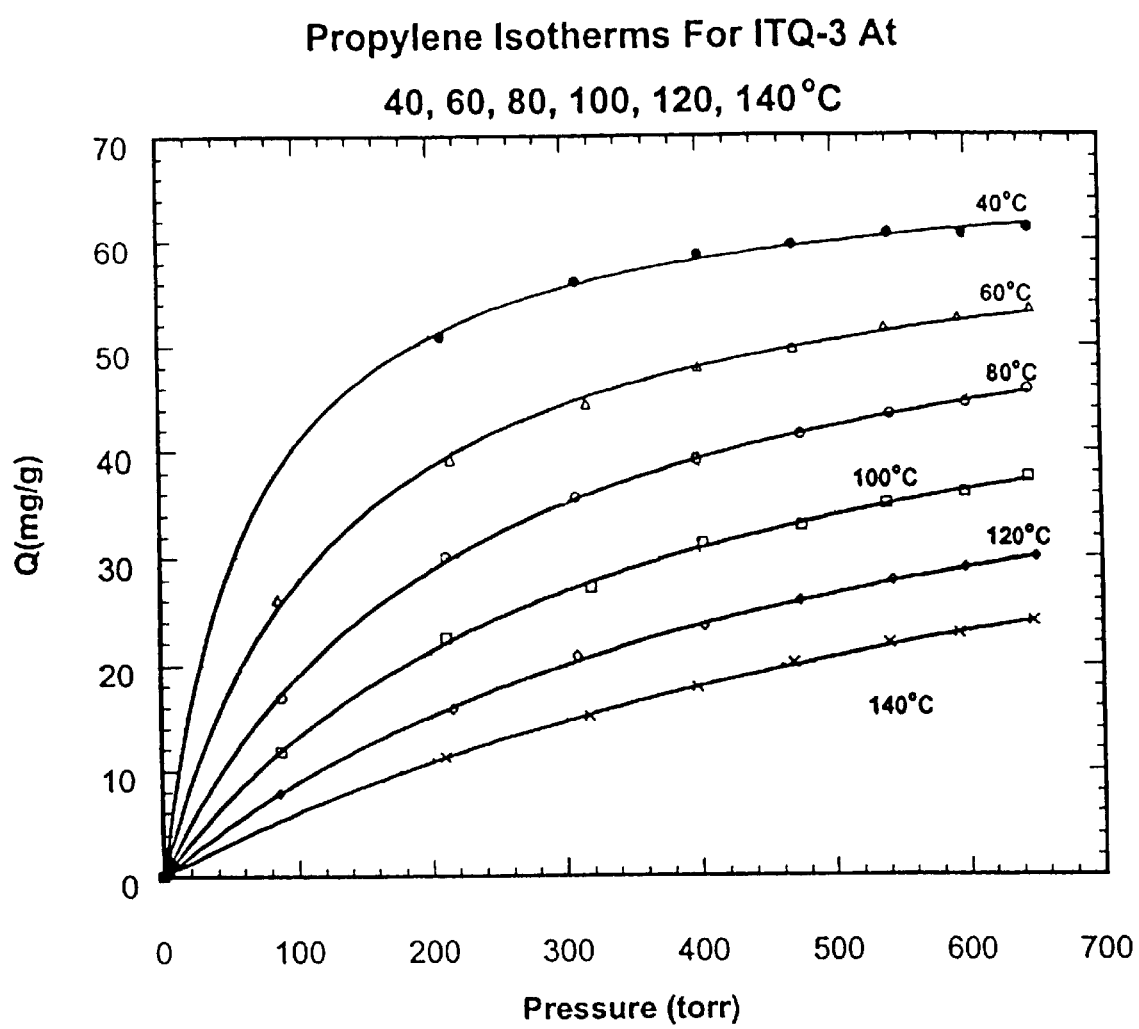
FIG. 8 shows adsorption isotherms for propylene adsorbed, in milligrams propylene per gram of zeolite, on ITQ-3 zeolite at pressures of about 0 to 700 torr and temperatures of 40° C., 60° C., 80° C., 100° C., 120° C. and 140° C.

Adsorption isotherms for the adsorption of propylene by the ITQ-3 zeolite were carried out. Isotherms for 40° C., 60° C., 80° C., 100° C., 120° C. and 140° C. are set forth in FIG. 8.

Example 7

Figure 9:
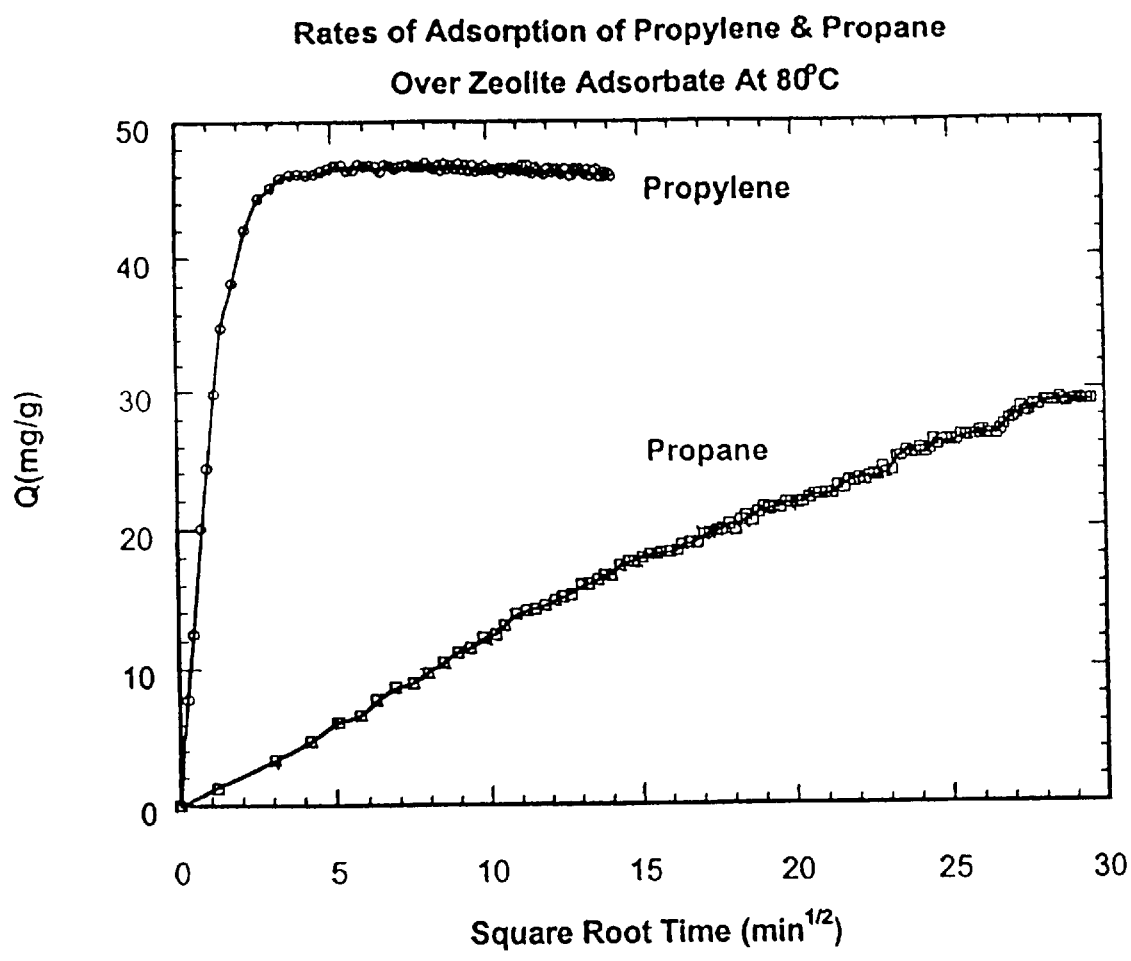
FIG. 9 shows the rates of adsorption of propylene and propane in milligrams propylene/propane per gram of zeolite ITQ-3 structure type over time and under conditions of 80° C. and 650 torr hydrocarbon.

The ITQ-3 zeolite employed in EXAMPLE 5 was contacted with propane at 650 torr pressure at 80° C. The rate of adsorption, D/r$^2$, was $7.4 \times 10^{-6}$ sec$^{-1}$. The relative propylene/propane diffusion rates, R$_D$, at 80° C. for this ITQ-3 zeolite was 510. These data are set forth in FIG. 9.

Example 8

The ITQ-3 structure employed in EXAMPLE 5 was contacted with propane at 600 torr pressure at 30° C. The rate of adsorption, D/r$^2$, was $2.2 \times 10^{-6}$ sec$^{-1}$. The relative propylene/propane diffusion rates, R$_D$, at 30° C. for this ITQ-3 zeolite was 690.

The results from EXAMPLES 5, 6, 7 and 8 for ITQ-3 zeolite in terms of propylene diffusion parameter, D/r$^2$, and the ratio of adsorption of propylene to propane adsorption rates, R$_D$, are set forth in TABLE 2. A comparison of the relative diffusion parameters of ITQ-3 for light hydrocarbons is set forth in TABLE 3. The R$_D$ results come within the limitations for the invention.

TABLE 2

Diffusion Rates of C$_3$ Hydrocarbons in ITQ—3

| Hydrocarbon | Temperature (0° C.) | Diffusion Parameter D/R$^2$ | R$_D$ |
| --- | --- | --- | --- |
| Propylene | 30 | $1.5 \times 10^{-3}$ | |
| Propane | 30 | $2.2 \times 10^{-6}$ | 690 |
| Propylene | 80 | $3.8 \times 10^{-3}$ | |
| Propane | 80 | $7.4 \times 10^{-6}$ | 510 |

TABLE 3

| Hydrocarbon | Diffusion Parameter D/r$^2$ (sec-1, 80° C.) |
| --- | --- |
| Ethane | $1.4 \times 10^{-2}$ |
| Ethylene | $1.1 \times 10^{-2}$ |
| Propane | $7.4 \times 10^{-6}$ |
| Propylene | $3.8 \times 10^{-3}$ |
| Hexane | $5.0 \times 10^{-7}$ |

Example 9

Figure 10:
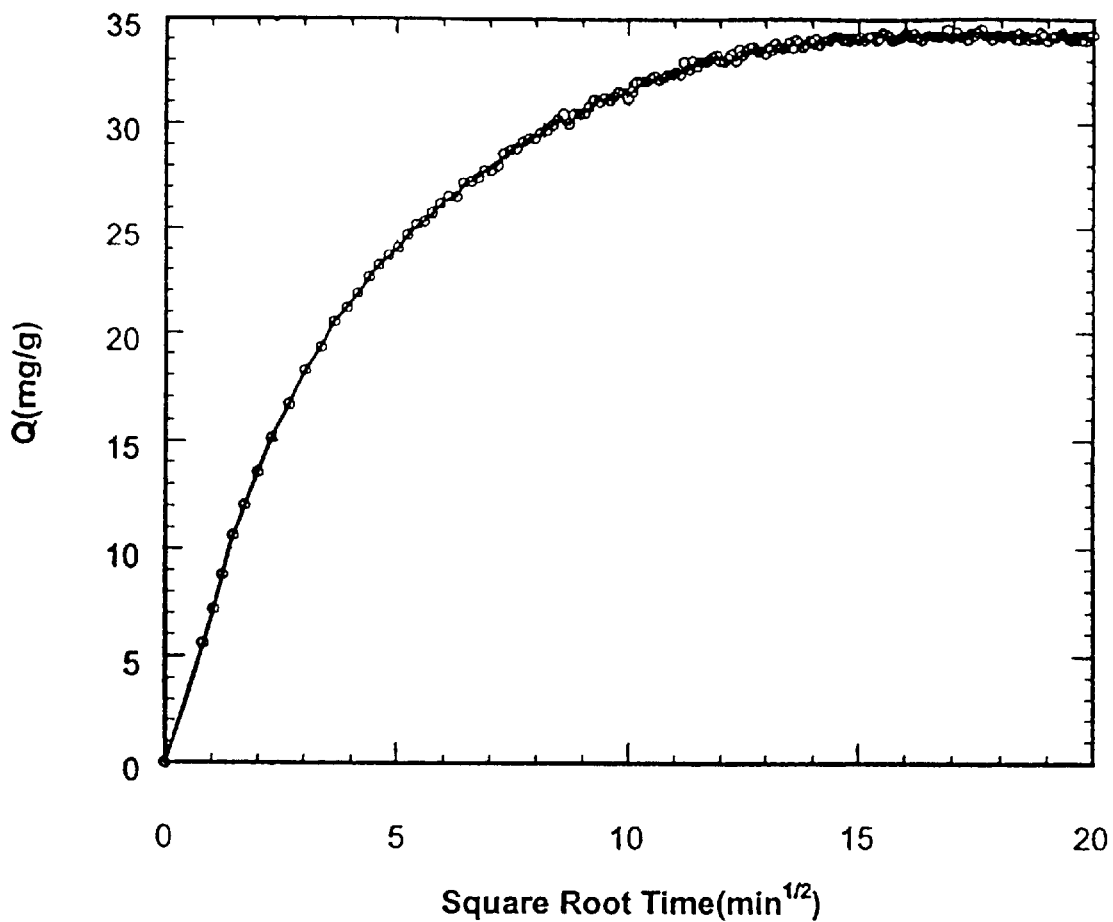
FIG. 10 shows the amount of propylene adsorbed in milligrams propylene per gram of zeolite ZSM-58/DD3R over time and under conditions of 600 torr propylene and 80° C.

A ZSM-58 zeolite material having an 8-member ring channel system and of the DDR type structure was contacted with propylene at 600 torr pressure at 80° C. until equilibrium was obtained. At equilibrium, this zeolite adsorbed 34 milligrams propylene per gram of zeolite. The rate of adsorption, D/r$^2$, was $2.6 \times 10^{-4}$ sec$^{-1}$. The amount of propylene adsorbed in milligrams per gram of this zeolite over time is shown in FIG. 10.

Example 9A

Figure 11:
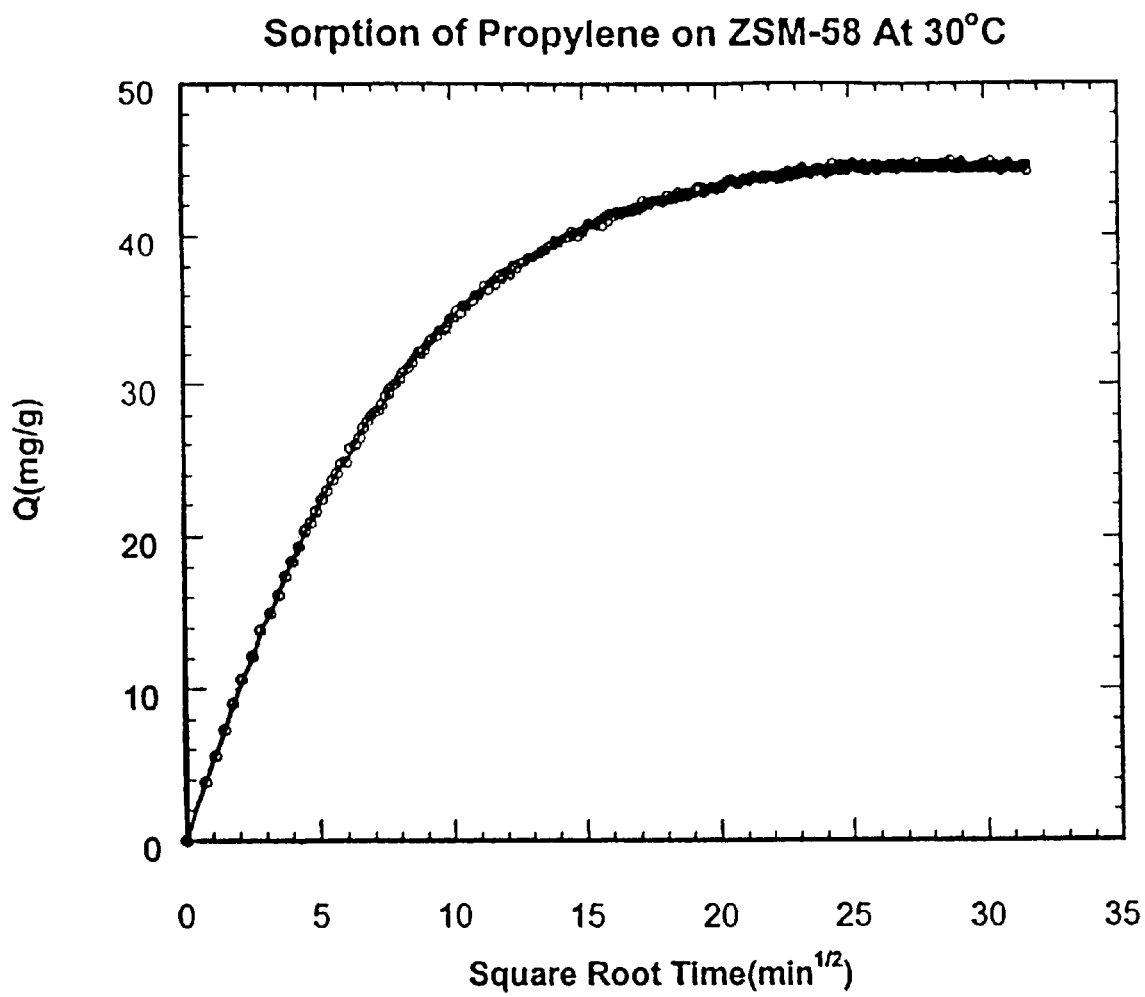
FIG. 11 shows the amount of propylene adsorbed in milligrams propylene per gram of zeolite ZSM-58/DD3R over time and under conditions of 600 torr propylene and 30° C.

The ZSM-58 zeolite material of EXAMPLE 9 was contacted with propylene at 30° C. and 600 torr propylene pressure. The rate of adsorption curve is set forth in FIG. 11 At equilibrium, 44 mg of propylene are adsorbed per gram of zeolite. The adsorption rate, D/r$^2$, was $1.2 \times 10^{-4}$ sec.$^{-1}$.

Example 10

Figure 12:
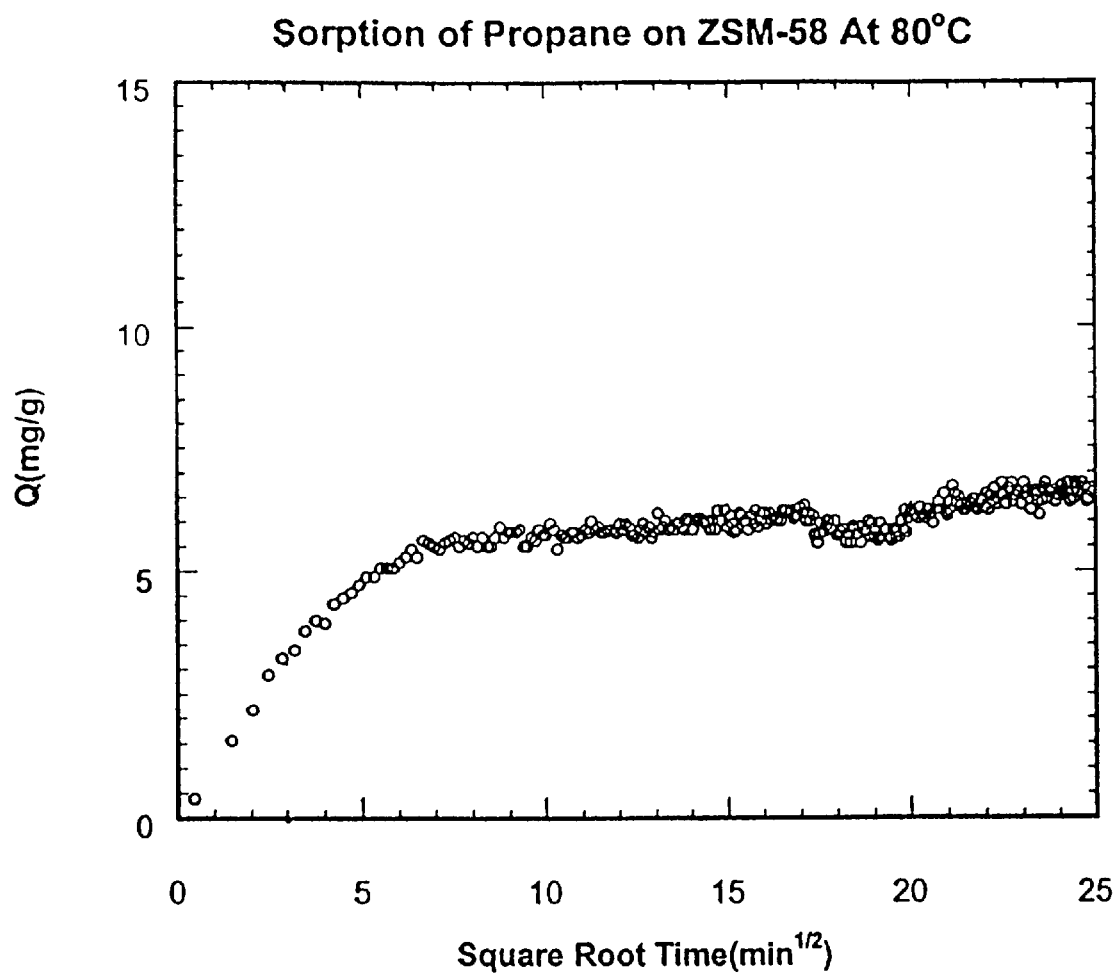
FIG. 12 shows the amount of propane adsorbed in milligrams propane per gram of zeolite ZSM-58/DD3R over time and under conditions of 600 torr propane and 80° C.
Figure 13:
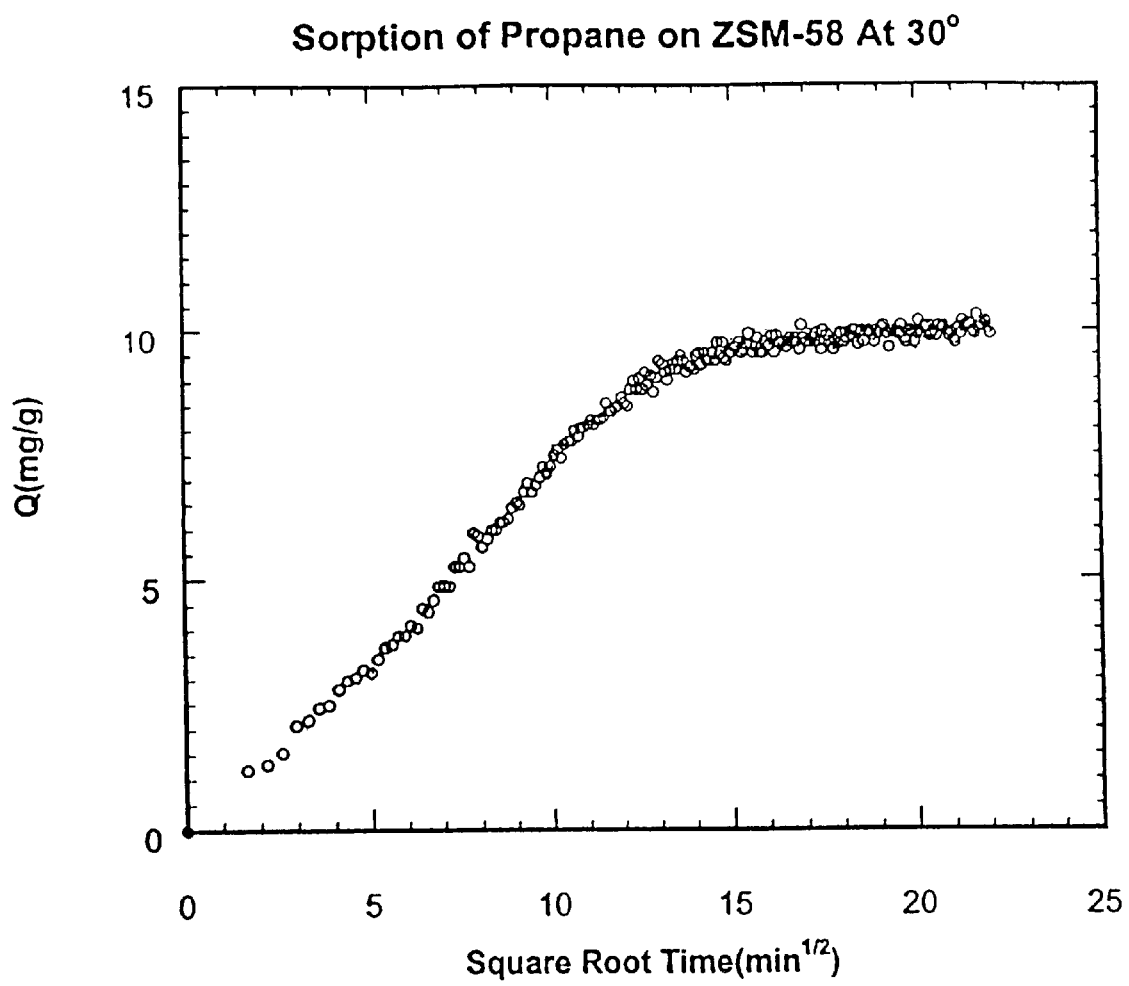
FIG. 13 shows the amount of propane adsorbed in milligrams propane per gram of zeolite ZSM-58/DD3R over time and under conditions of 600 torr propane and 30° C.

The ZSM-58/DD3R zeolite employed in EXAMPLE 9 was contacted with propane at 600 torr pressure at 30° C. and 80° C. For each experiment, two adsorption steps are observed, the fast step being completed at about ~15 min$^{1/2}$ (for 30° C.) and ~7 min$^{1/2}$ (for 80° C.). The rates of adsorption for the fast adsorption process are respectively $2.8 \times 10^{-4}$ sec$^{-1}$ at 80° C. and $1.1 \times 10^{-4}$ sec$^{-1}$ at 30° C. The rates of adsorption for the slow adsorption step or process are respectively $1.8 \times 10^{-7}$ sec$^{-1}$ at 80° C. and $9.6 \times 10^{-9}$ sec$^{-1}$ at 30° C. The amount of propane adsorbed in milligrams per gram of this zeolite over time, and at 600 torr pressure as shown in FIG. 12 for 80° C. and in FIG. 13 for 30° C. The results for the fast and slow adsorption steps or processes at 30° C. and 80° C. are also set forth in TABLE 4 herebelow.

A summary of results obtained in the above-referenced examples for Si—CHA, ITQ-3 and ZSM-58/DD3R zeolites is set forth in TABLE 4.

TABLE 4

Propylene Adsorption Capacities and Relative Diffusion Rates

| Zeolite | Pore System | Adsorption Capacity (mg/g)$^a$ | | Relative D's $R_D$ (C3 = /C3°, 8° C. |
| --- | --- | --- | --- | --- |
| | | 80° C. | 30° C. | |
| Si-CHA | 3-d | 90 | 120$^b$ | 1,500(43,600 @ 30° C.) |
| ITQ-3 | 1-d$^c$ | 46 | 63 | 510 |
| ZSM-58/DD3R | 2-d | 30 | 42 | 1.0 @ 30° C. and 0.9 @ 80° C. (fast step) 12,400 @ 30° C. (slow step) 1,410 @ 80° C. (slow step) |

$^a$Hydrocarbon pressure = 600 torr. P/P° = 0.023 at 80° C. and 0.063 at 30° C.
$^b$Simulated propylene pore capacity is 117 mg/g.
$^c$Multifile diffusion.

While the results for Si—CHA and ITQ-3 zeolites show excellent separation parameters, the results for ZSM-58/DD3R zeolites indicate inadequate separation parameters. In TABLE 4, for zeolite ZSM-58/DD3R, the term "fast step" is used to describe the result obtained for the fast adsorption process which dominates the adsorption during the early times on stream, e.g. 7–15 min$^{1/2}$. For the fast step the $R_D$ value is 1.0, meaning that the propylene and propane have essentially equal adsorption rates. The slow adsorption step, clearly observable at longer adsorption times, gives $R_D$ values of 12,400 and 1,410, at 30° and 80° C., respectively. In a separation process using this adsorbent, the adsorption associated with the "fast step" would dominate and this adsorbent would be ineffective in bringing about propylene/propane separation. This ZSM-58/DD3R is thus an unacceptable adsorbent for this process.

Example 11

Figure 14:
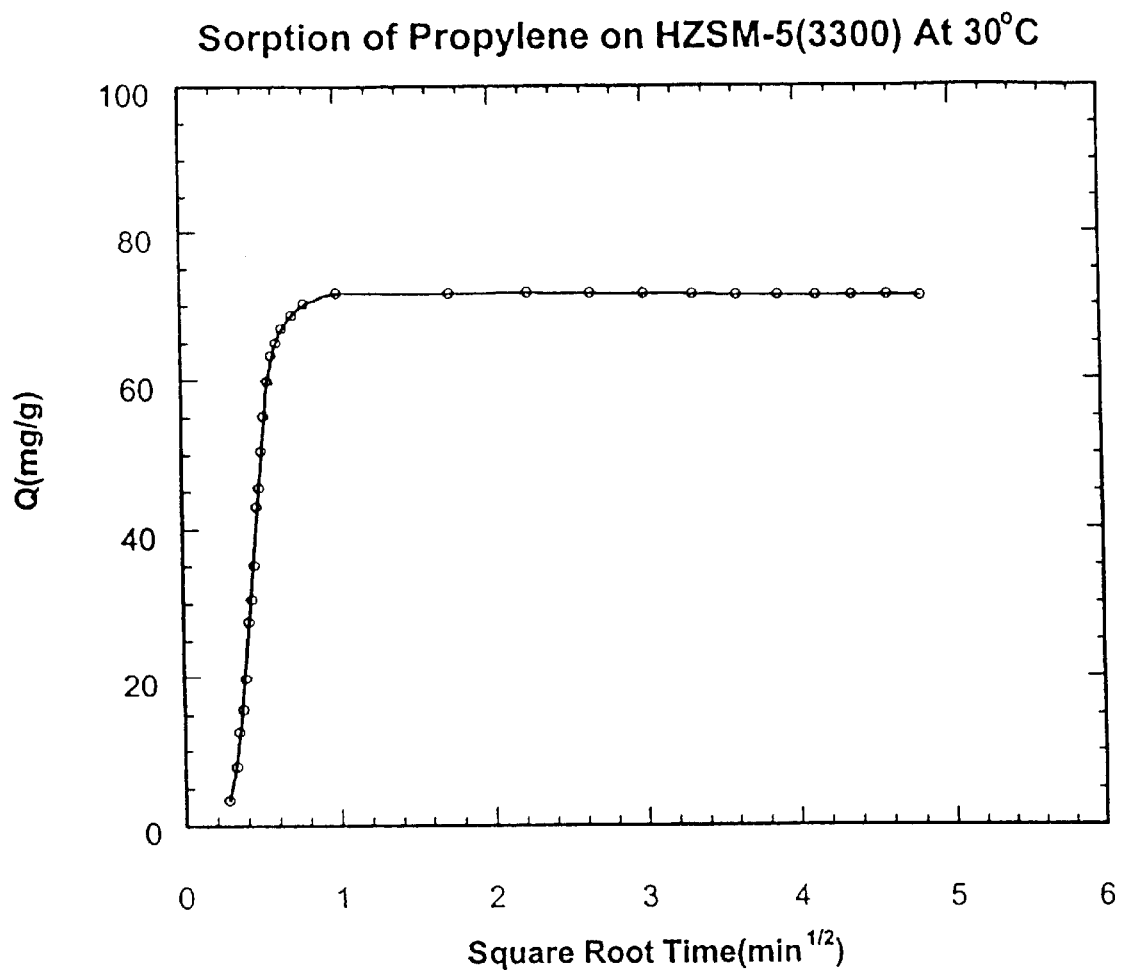
FIG. 14 shows the amount of propylene adsorbed in milligrams propylene per gram 10-member ring zeolite HZSM-5 over time and under conditions of 600 torr propylene and 30° C.

HZSM-5 zeolite having a silica to alumina ratio of 3,300 was contacted with propylene at 30° C. and 600 torr propylene pressure. At equilibrium 72 mg/g of propylene was adsorbed. The D/r$^2$ was 0.15 sec$^{-1}$. These data are shown in FIG. 14.

Example 12

Figure 15:
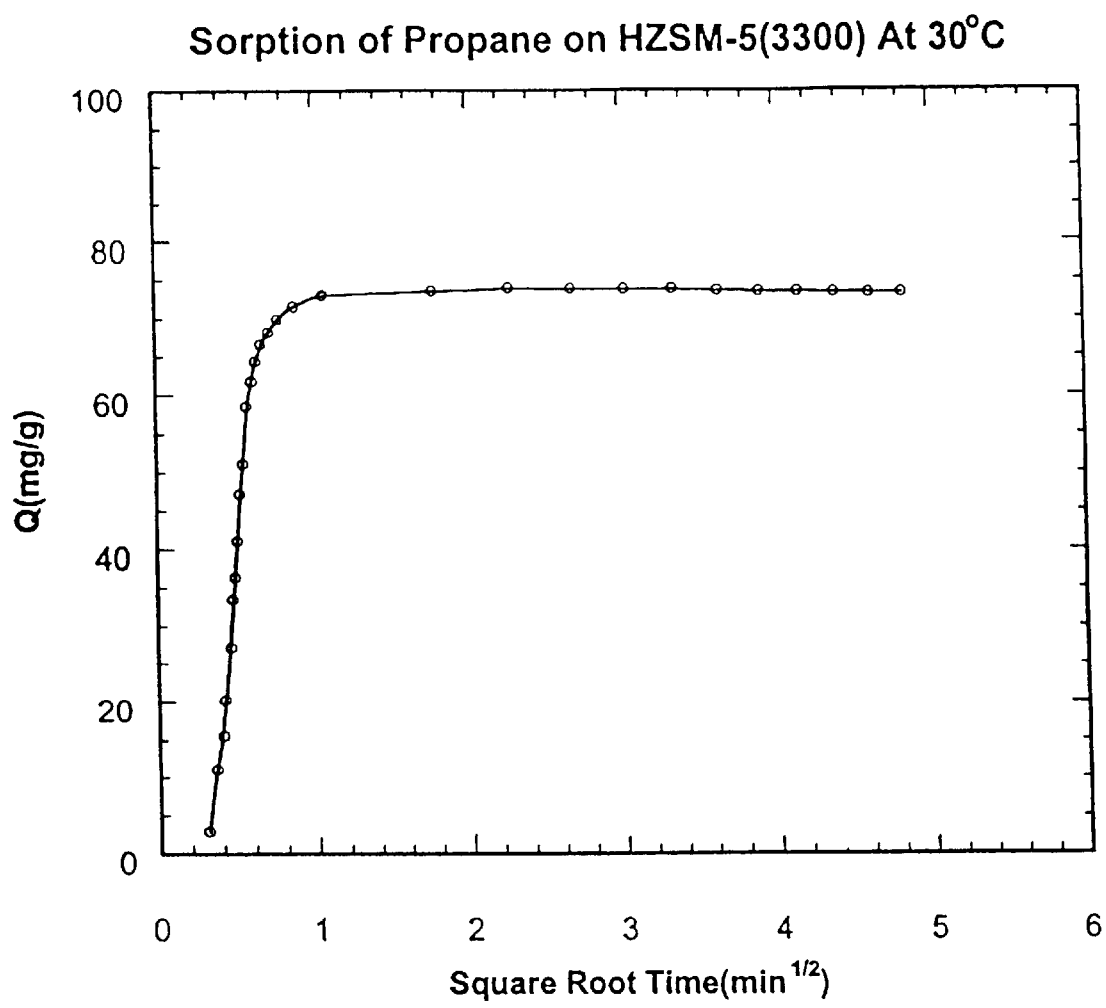
FIG. 15 shows the amount of propane adsorbed in milligrams propane per gram 10-member ring zeolite HZSM-5 over time and under conditions of 600 torr propane and 30° C.

HZSM-5 zeolite having a silica to alumina ratio of 3,300 was contacted with propane at 30° C. and 600 torr propane pressure. At equilibrium, 74 mg/g of propane was adsorbed. The D/r$^2$ was 0.10 sec$^{-1}$. These data are shown in FIG. 15. The $R_D$ ratio is 1.4, demonstrating that 10-ring zeolites are not effective for the kinetic separation of propylene from propane.

While certain embodiments of the present invention have been described and/or exemplified above, various other embodiments will be apparent to those skilled in the art from the foregoing disclosure. The present invention is, therefore, not limited to the particular embodiments described and/or exemplified, but is capable of considerable variation and modification without departure from the scope of the appended claims.

What is claimed is:

1. A process for kinetic separation of a light hydrocarbon mixture comprising at least propylene and propane, by preferably absorbing propylene on a zeolite adsorbent, said zeolite phase containing 8-member rings of tetrahedra as the pore-opening controlling hydrocarbon diffusion, the propane being non-preferentially adsorbed, said process comprising the steps of:
   (a) contacting said light hydrocarbon mixture with a zeolite adsorbent, characterized by having a diffusion rate which is at least 50 times greater for the propylene as compared to the propane and having a silica-to-alumina ratio greater than about 200; and
   (b) recovering said propylene.

2. A process as claimed in claim 1, wherein said zeolite has a silica-to-alumina ratio greater than about 500.

3. A process as claimed in claim 1, wherein said zeolite has a silica-to-alumina ratio greater than about 1000.

4. A process as claimed in claim 1, wherein said zeolite has a silica-to-alumina ratio greater than about 2000.

5. A process for kinetic separation of a light hydrocarbon mixture comprising at least propylene and propane, by preferably absorbing propylene on a zeolite adsorbent, said zeolite phase containing 8-member rings of tetrahedra as the pore-opening controlling hydrocarbon diffusion, the propane being non-preferentially adsorbed, said process comprising the steps of:
   (a) contacting said light hydrocarbon mixture with a zeolite adsorbent, characterized by having a diffusion rate which is at least 50 times greater for the propylene as compared to the propane and having a propylene adsorption capacity greater than 40 mg/g; and
   (b) recovering said propylene.

6. A process as claimed in claim 5, wherein said zeolite is of CHA structure type.

7. A process as claimed in claim 6, wherein said zeolite has a silica-to-alumina ratio greater than about 200 and contains alkali metal ions as the cations balancing the framework charge.

8. A process as claimed in claim 6, wherein said zeolite has a silica-to-alumina ratio greater than about 500 and contains alkali metal ions as the cations balancing the framework charge.

9. A process as claimed in claim 6, wherein said zeolite has a silica-to-alumina ratio greater than about 1000 and contains alkali metal ions as the cations balancing the framework charge.

10. A process as claimed in claim 6, wherein said zeolite has a silica-to-alumina ratio greater than about 2000 and contains alkali metal ions as the cations balancing the framework charge.

11. A process as claimed in claim 6, wherein said CHA structure type 8-member rings zeolite is selected from the group consisting of Si—CHA, high silica chabazite, AlPO$_4$—(CHA), CaAPO-44, CaAPO-47, GaPO$_4$-34, LZ-218, Linde D, Linde R, MeAPO-47, MeAPSO-47, Phi, SAPO-34, SAPO-47, SSZ-13, Wilhendersonite, ZK-14 and ZYT-6 and mixtures thereof.

12. A process as claimed in claim 5, wherein the zeolite has the ITE structure type.

13. A process as claimed in claim 12, wherein the zeolite has the ITE structure type, a silica-to-alumina ratio greater than about 200 and contains alkali metal ions as the cations balancing the framework charge.

14. A process as claimed in claim 12, wherein the zeolite has the ITE structure type, a silica-to-alumina ratio greater than about 500 and contains alkali metal ions as the cations balancing the framework charge.

15. A process as claimed in claim 12, wherein the zeolite has the ITE structure type, a silica-to-alumina ratio greater than about 1000 and contains alkali metal ions as the cations balancing the framework charge.

16. A process as claimed in claim 12, wherein the zeolite has the ITE structure type, a silica-to-alumina ratio greater than about 2000 and contains alkali metal ions as the cations balancing the framework charge.

17. A process as claimed in claim 12, wherein said ITE structure type is ITQ-3.

18. A process as claimed in claim 12, wherein the zeolite has the SAPO-34 structure type, and contains alkali metal ions as the cations balancing the framework charge.

19. The process as claimed in claim 5, wherein the zeolite is substantially acid-free.

20. The process as claimed in claim 19, wherein the zeolite contains no acid.

21. The process as claimed in claim 5, wherein the zeolite does not polymerize olefins.

22. The process as claimed in claim 5, wherein the zeolite adsorbent has a diffusion rate which is at least 100 times greater for propylene as compared to propane.

23. The process as claimed in claim 5, wherein said zeolite has a propylene adsorption capacity greater than 60 mg/g.

24. The process as claimed in claim 5, wherein the size of the zeolite adsorbent is no larger than 1.0 microns.

25. The process as claimed in claim 5, wherein the size of the zeolite adsorbent is no larger than 0.1 microns.

26. The process as claimed in claim 5, wherein the recovery step (b) is carried out by a desorbing technique selected from at least one of stripping with another gas, pressure change, temperature change, or a combination of these methods.

27. The process as claimed in claim 5, wherein the recovery of the propylene is carried out by at least one of a single pressure swing absorption process, a multi-stage pressure swing adsorption process, a single stage membrane-based process, a multi-stage membrane-based process, or a flow-type system.

28. The process as claimed in claim 5, wherein the process is carried out in a temperature range between $-100°$ C. and about $250°$ C.

29. The process as claimed in claim 28, wherein the process is carried out at a temperature range of between $-20°$ C. and $+100°$ C.

* * * * *